US011873536B2

(12) United States Patent
Negretto

(10) Patent No.: US 11,873,536 B2
(45) Date of Patent: Jan. 16, 2024

(54) ENVIRONMENTALLY FRIENDLY PROCESS FOR TANNING HIDES

(71) Applicant: BEKEN ITALIA S.R.L., Arzignano (IT)

(72) Inventor: Mirko Negretto, Arzignano (IT)

(73) Assignee: BEKEN ITALIA S.R.L., Arzignano (IT)

( * ) Notice: Subject to any disclaimer, the term of this patent is extended or adjusted under 35 U.S.C. 154(b) by 0 days.

(21) Appl. No.: 18/015,515

(22) PCT Filed: Jul. 20, 2021

(86) PCT No.: PCT/IB2021/056546

§ 371 (c)(1),
(2) Date: Jan. 10, 2023

(87) PCT Pub. No.: WO2022/018632

PCT Pub. Date: Jan. 27, 2022

(65) Prior Publication Data

US 2023/0175082 A1 Jun. 8, 2023

(30) Foreign Application Priority Data

Jul. 22, 2020 (IT) ........................ 102020000017719

(51) Int. Cl.

| | |
|---|---|
| ***C14C 3/28*** | (2006.01) |
| ***C14C 1/04*** | (2006.01) |
| ***C14C 1/06*** | (2006.01) |
| ***C14C 1/08*** | (2006.01) |
| ***C14C 3/06*** | (2006.01) |
| ***C14C 3/10*** | (2006.01) |

(52) U.S. Cl.
CPC .................. *C14C 3/28* (2013.01); *C14C 1/04* (2013.01); *C14C 1/065* (2013.01); *C14C 1/08* (2013.01); *C14C 3/06* (2013.01); *C14C 3/10* (2013.01)

(58) Field of Classification Search
CPC .... C14C 3/28; C14C 3/06; C14C 3/10; C14C 1/04; C14C 1/065; C14C 1/08
See application file for complete search history.

(56) References Cited

U.S. PATENT DOCUMENTS

| | | | | |
|---|---|---|---|---|
| 4,126,413 A | | 11/1978 | Traubel et al. | |
| 4,902,298 A | * | 2/1990 | D'Elia ...................... | C14C 3/06 8/94.29 |
| 2005/0268671 A1 | | 12/2005 | Lourenco | |
| 2015/0376726 A1 | | 12/2015 | Bertkau et al. | |

FOREIGN PATENT DOCUMENTS

| | | | | |
|---|---|---|---|---|
| WO | WO 2012150179 | * | 11/2012 | ............... C14C 3/08 |

OTHER PUBLICATIONS

International Search Report and Written Opinion in corresponding PCT Application No. PCT/IB2021/056546, dated Nov. 11, 2021, 12 pages.

* cited by examiner

*Primary Examiner* — Amina S Khan
(74) *Attorney, Agent, or Firm* — Fish IP Law, LLP

(57) ABSTRACT

The present invention relates to a process for the tanning of animal hides characterised, compared to currently adopted processes, by the non-adoption of the step known in the industry as "pickling". The invention also concerned hides tanned by said process.

14 Claims, 1 Drawing Sheet

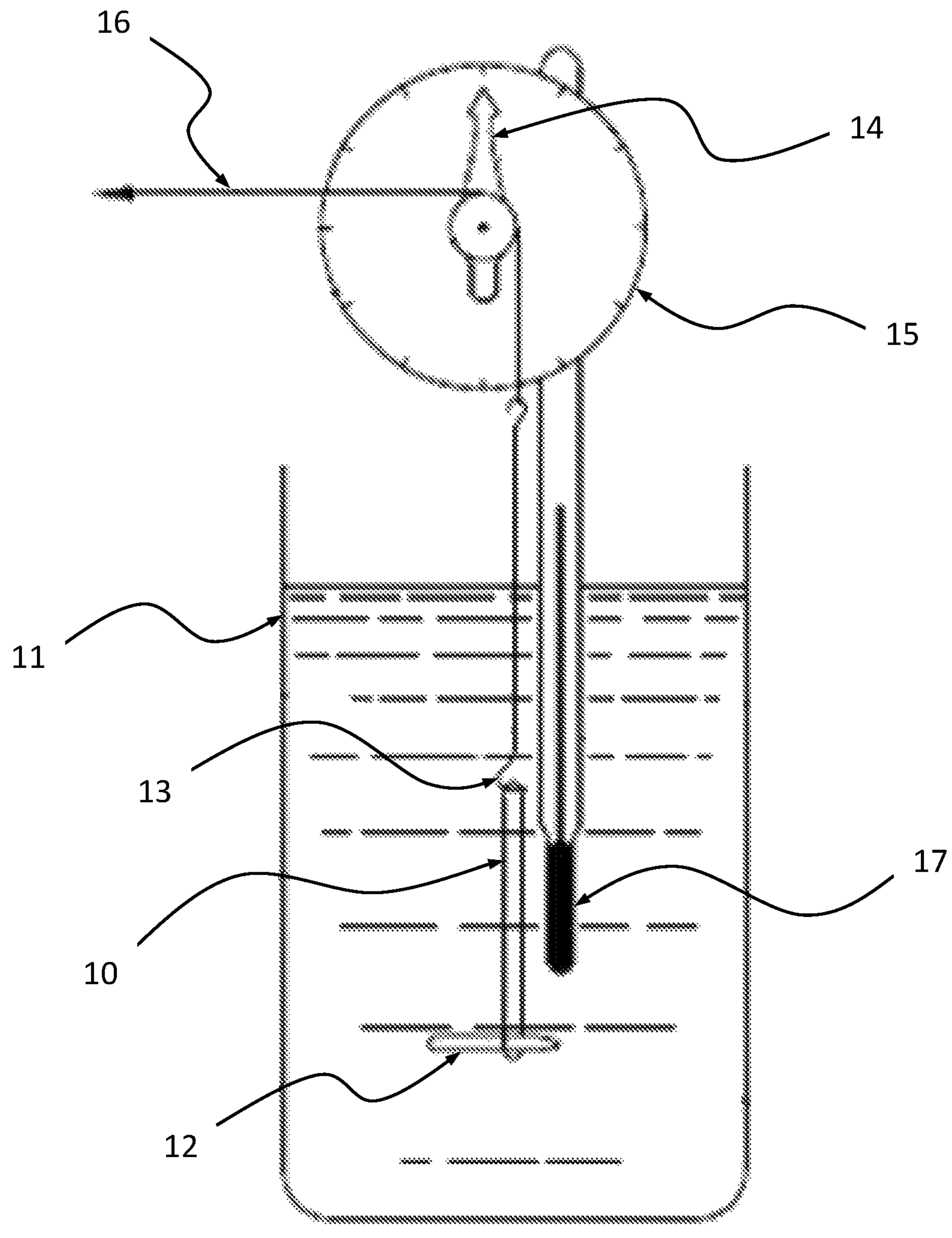
16
14
15
11
13
17
10
12

ENVIRONMENTALLY FRIENDLY PROCESS FOR TANNING HIDES

FIELD OF THE INVENTION

The present invention refers to an innovative process for the tanning of animal hides characterised, compared to currently adopted processes, by the non-adoption of the step known in the industry as "pickling", which is one of the main sources of pollution caused by the tanning industry. The invention also concerns hides tanned by the new process.

STATE OF THE ART

Tanning is the treatment to which the hides are subjected in order to transform them into leather, thus allowing their preservation indefinitely and the processing to make them suitable for use in various industrial sectors, including furniture and clothing, leather goods industry (bags, shoes and leather accessories) and in the automotive sector.

Hide preservation treatments, from the slaughter of the animals to tanning (and possible further subsequent treatments), have been known for centuries and have many variations; it is not possible to give an exhaustive description of these treatments here, for which reference should be made to specialised manuals, such as the book Tanning Chemistry: The Science of Leather, Anthony D. Covington and William R. Wise, Royal Society of Chemistry, $2^{nd}$ Edition, 2019.

In short, all hide treatment processes essentially comprise the following steps:

Preservation: this operation must be carried out as quickly as possible after killing the animal, and consists in creating conditions inside the hide that prevent the development of microorganisms that would cause the putrefaction thereof. The most widely used methods for this purpose are salting and drying;

Soaking: has the purpose to give the hide back the water that it had lost in the preservation process, and to eliminate sodium chloride in the case of hides preserved by salting. This operation, as well as many of the subsequent ones in the process, is normally carried out in a "drum", a machine consisting of a cylinder rotating around its axis into which the hides to be treated are introduced together with water and/or the chemicals necessary for the specific operation. In the case of soaking, the hides are treated with water and varying amounts of surfactants;

Liming: this is one of the fundamental operations of the tanning process, and allows various effects to be obtained. This operation is carried out by treating the hides with calcium hydroxide ($Ca(OH)_2$), which brings the pH of the bath to values around 12.5, in the presence of reducing agents, particularly sodium sulphide ($Na_2S$). The main effects of liming are the depilation of the hide and its swelling and turgidity due to osmotic pressure caused by the high concentration of $Na^+$, $Ca^{2+}$ and OW ions. Other effects of this operation are the elimination from the hide of part of the natural fats (by saponification) and of the globular proteins (by solubilisation), which could interfere with the subsequent operations; and the hydrolysis of part of the amide side groups of the collagen protein chain with the formation of free carboxylate groups ($R—COO^-$) which are added to those already naturally present on the collagen molecules, increasing the possibilities of binding with the tanning metal and consequently facilitating tanning;

Deliming: the calcined hide is swollen and strongly alkaline, and in this state could not be subjected to the subsequent chemical operations. Deliming serves to lower the pH of the hide to around 8-9, eliminate swelling and turgidity, and eliminate calcium hydroxide and sodium sulphide. This operation is carried out with mildly acidic chemicals. Ammonium sulphate is generally used for cowhides, but other products such as weak organic acids (lactic acid, glycolic acid, etc.), sulphophthalic acid, sodium bisulphite and the like, or mixtures of these compounds, may also be used;

Maceration: Maceration is an enzymatic operation whose purpose is to complete deliming, eliminate residues of other unhelpful interfibrillar substances, loosen the fibrous structure of the hide so as to facilitate the expulsion of the pigments (melanins) and hair roots remained still embedded in the hide and produce a softer leather. Baths of animal pancreatic enzymes, possibly obtained from bacteria modified by genetic engineering, can be used for the operation. This operation can be carried out mildly, or not at all, if the intention is to produce a stiff and little flexible leather;

Pickling: in this operation, the pH of the hide is brought to a value between about 3 and 4, generally using a mixture of sulphuric and formic acids, to prepare it for tanning. The aim is both to prevent the formation of chromium hydroxides (which occurs at pH values above 4-4.5), which would make the addition of the element useless, and to neutralize the free carboxylate groups produced in the liming step by forming R—COOH carboxyl groups. The reason is that carboxylate groups are extremely reactive towards tanning metals, particularly $Cr^{3+}$ ions, so that the reaction would occur very quickly and effectively with the carboxylate groups on the surface of the hide, preventing further penetration of the tanning agent into the hide. To avoid the osmotic swelling of the hide that would occur at these pH values, high amounts of sodium chloride are also added to the bath, between 5 and 15%, typically between 6 and 8%, by weight of the hide; on this subject, see for example the book Tanning Chemistry: The Science of Leather quoted above, paragraph 9.2.2, which indicates 6% by weight as the minimum amount of sodium chloride to be used in pickling;

Tanning: finally, the hide deriving from the pickling process is subjected to the actual tanning process, the chemical operation that transforms the still putrescible hide into an imputrescible material, i.e. leather. There are many types of tanning, but the most common ones are chrome tanning (about 80-90% of all the leathers produced worldwide are chrome tanned) and tanning with mixtures of synthetic and vegetable tannins, aldehydes, particularly glutaraldehyde, and metallic salts, particularly of aluminium and zirconium. The product obtained by chrome tanning has a light blue-green colour and is referred to in the industry as "wet blue", while tanning by mixtures of tannins, aldehydes and metallic salts (of metals other than chrome) gives an essentially white product and the product obtained is referred to as "wet white".

In addition to these fundamental steps, a tanning process may comprise other steps, such as fleshing (mechanical removal of residues of subcutaneous tissues), carried out before or, preferably, immediately after liming; splitting in the case of very thick hides (typically cowhides, while thinner sheep hides do not require or do not allow this operation), also carried out after liming and which consists in forcing the hide, by passing between two rollers, against a blade which divides it into two layers in a parallel manner to its surface; and degreasing, an operation carried out (normally using surfactants) between maceration and tanning when necessary, i.e. in the case of hides still containing high amounts of fat after maceration which could interfere with the tanning.

As described above, pickling is a fundamental and necessary step in known tanning processes, but it is also one of the steps that causes the greatest environmental problems; after this step, a solution containing sulphates and, above all, high amounts of sodium chloride are discharged. Purification plants are able to reduce practically all the pollutants present in the waste water of the tanning processes, except for sodium chloride which therefore remains in the waste water. Sodium chloride is not a toxic or harmful product, but it strongly alters the environment of rivers and lakes into which the discharges of the tanning plants flow, with strong impacts on the flora and fauna of these environments.

Patent application US 2005/0268671 A1 describes a process for the tanning of hides which has the stated purpose of achieving a better fixation of chromium salts in the wet blue tanning, and thus a lower dispersion of these salts in the environment. According to the document, this would be possible with a step of preparation for tanning carried out at higher pH values than those traditionally adopted, and which further makes it possible to reduce or even avoid the use of sodium chloride in the pickling step. In spite of this statement in the general description, in the examples sodium chloride is always used in relevant amounts, between 5 and 7% with respect to the weight of the hide, which are characteristic of the pickling steps of the prior art; moreover, no indicative data is reported on the quality, type (e.g. of cow, sheep, goat, etc.) and weight check (e.g. of cow 36 kg+ or above 40 kg, etc.) of the hides obtained according to the described tanning process.

The object of the present invention is to provide a process for the tanning of hides that avoids the pickling step and thus the use of sodium chloride. Another object of the invention is to provide hides tanned according to this process.

SUMMARY OF THE INVENTION

This object is achieved by the present invention, which in a first aspect thereof relates to a process for the tanning of hides which includes the steps of soaking, liming, deliming, maceration, preparation for tanning, and tanning, characterized in that in the step of preparation for tanning the hides are treated with a liquid mixture consisting of:

- water in an amount between 40 and 60% by weight with respect to the weight of the hide;
- between 0.5 and 2.5% by weight with respect to the weight of the hide of an emulsion containing between 45 and 60% by weight of water and between 40 and 55% by weight of an oil consisting of one or more sulphonates of general formula R—$SO_3H$, wherein R is a C4-C20 alkyl radical;
- between 0.2 and 1.5% by weight with respect to the weight of the hide of a mixture of C4-C6 dicarboxylic acids containing between 10 and 30% by weight of succinic acid, between 40 and 60% by weight of glutaric acid and between 15 and 35% by weight of adipic acid; and
- a salt selected from sodium acetate and sodium formate or mixtures thereof in an amount between 1 and 2% by weight with respect to the weight of the hide.

In its second aspect, the invention concerns a hide tanned by the process described above.

BRIEF DESCRIPTION OF THE DRAWINGS

FIG. 1 shows schematically the experimental set-up for measuring the quality of a tanned hide (measurement of shrinkage temperature).

DETAILED DESCRIPTION OF THE INVENTION

The inventor has found that the treatment characteristic of the process of the invention, carried out with the mixture of water, an emulsion of sulphonates, C4-C6 dicarboxylic acids and sodium acetate and/or formate, makes it possible to avoid the pickling operation carried out in the processes of the prior art, and which as described above is one of the main sources of pollution in the tanning industry.

In the following description and in the claims, unless otherwise indicated, all concentrations and purities are given as percentage values by weight. In addition, all amounts of compounds used in the various steps of the process are expressed as percentages by weight with respect to the weight of the hide treated in that step (the weight of the hide may vary during the process, e.g. as a result of fleshing or splitting).

The process of the invention comprises a series of steps carried out according to traditional methods, with the pickling being replaced by the characterising step mentioned above.

A typical process of the invention includes steps of soaking, liming, deliming, maceration, preparation for tanning, and tanning carried out as described below.

Soaking is carried out with a first step of continuous washing with running water for one hour or discontinuously, for example with the addition of two successive aliquots of water each in an amount of about twice the weight of the hide; and a second step of treatment in a drum with an amount of water of about twice the weight of the hide, for 16-24 hours. In the second step, salts can be added to the water to give the solution a basic pH, e.g. sodium bicarbonate, or surfactant detergents. The temperature of the soaking step is preferably around 20-25° C., and in any case not higher than 45° C.; in case of temperatures higher than 25° C., an antibacterial product (anti-mould agent) must be added to the water to prevent the proliferation of microorganisms that could alter the hide.

The liming step can be carried out in any way known in the industry. This step is preferably carried out at room temperature, with a weight of water about double that of the hide to be treated, $Ca(OH)_2$ in an amount between 3 and 5%, and sodium sulphide ($Na_2S$) normally between 2 and 3% or sodium hydrosulphide (NaHS) in an amount between 0.5 and 1%. This step is protracted for a time between 18 and 36 hours, commonly between 21 and 24 hours.

The deliming step is carried out at a temperature of about 30 to 38° C., preferably in two successive phases, each carried out with an amount of water equal to the weight of hide to be treated, by draining the water between one phase and the next, and in which the second phase is carried out at a slightly higher temperature (e.g., 2° C.) than the first. The total time of the deliming step is about 3 to 4 hours. In this step are used altogether, subdivided into the two phases:

a mixture containing between 40 and 45% of ammonium chloride ($NH_4Cl$), between 20 and 30% of one or more C4-C6 dicarboxylic acids, and between 0.5 and 1.5% of sulfamic acid ($H_2NSO_3H$), with the balance to 100% consisting of ammonium sulphate ($(NH_4)_2SO_4$); this mixture is added in this step in amounts between about 0.8 and 1.5% in the case of split hides and between 1.5 and 3% in the case of unsplit hides;

ammonium sulphate between about 0.4 and 1.0%; and between 0.3 and 1.5% of a degreaser known in the field. As an example of a degreaser, one can mention a liquid mixture consisting of about 54-58% by weight of 2-propylethyl alcohol ethoxylate (a commercially available component with CAS registry no. 160875-66-1), between 2 and 3% of sodium salts of sulphates of C12-C14 alcohol ethoxylates (CAS no. 68891-38-3) and between 0.01 and 0.04% of 1,2-benzisothiazol-3 (2H)-one (CAS no. 2634-33-5); also in this mixture the balance to 100% consists of ammonium sulphate.

The maceration step is carried out at a temperature between 30 and 37° C., with amounts of water between about 0.5 and 1.5 times the weight of the hide to be treated, for a total time between 3 and 5 hours. This step is completed by a series of washes, carried out with an amount of water between 2 and 4 times the weight of the hide. Pancreatic enzymes are added to the water of the maceration step in amounts between 0.1 and 2%. In this step, or in the subsequent washes (two or three, each lasting from 10 to 20 minutes), other components may be added to the water, for example up to about 0.5% by weight of a degreaser (e.g. the mixture of 2-propylethyl alcohol ethoxylate, sodium salts of sulphates of C12-C14 alcohol ethoxylates, 1,2-benzylisothiazol-3(2H)-one and ammonium sulphate mentioned above), up to 1.2% of the mixture of ammonium chloride, C4-C6 dicarboxylic acids and sulfamic acid mentioned above, about 0.2% by weight of ammonium sulphate and up to about 0.4% by weight of hydrogen peroxide.

The characterizing step of the process of the invention is the preparation for tanning one, which is carried out without using sodium chloride.

This step is carried out at a temperature between 15 and 25° C., preferably at 20° C., for a time between 1 and 2.5 hours, with an amount of water between 40 and 60% with respect to the weight of the hides to be treated.

As mentioned above, in this step water is added with:

between 0.5 and 2.5% of an emulsion containing between 45 and 60% by weight of water and between 40 and 55% by weight of an oil consisting of one or more sulphonates of general formula R—$SO_3H$, wherein R is a C4-C20 alkyl radical, preferably a C6-C14 radical, and even more preferably a C12-C14 radical;

between 0.2 and 1.5% of a mixture of C4-C6 dicarboxylic acids containing between 10 and 30% by weight of succinic acid, between 40 and 60% by weight of glutaric acid and between 15 and 35% by weight of adipic acid; and a salt selected from sodium acetate and sodium formate in an amount between 1 and 2%.

An antibacterial product can be added to the treatment water in amounts between 0.1 and 0.2%. Antibacterial (or anti-mould) products for tanning processes are widely available commercially; a possible product of this type comprises 25-35% by weight of sodium salt of 4-chloro-3-methylphenol, 8-12% of 2-phenylphenol, 11-15% of diethylene glycol and 12-14% of sodium hydroxide, with water as a 100% complement.

In addition to avoiding pickling and the consequent release of sodium chloride into the environment, the step before tanning of the invention offers other environmental advantages.

The sulphonate-based oil described above has a very low content of volatile organic compounds (often also indicated with the corresponding abbreviation VOC). A low VOC value of the tanned hides allows having a very low environmental impact, both in domestic use and in the workplace, and even more so in small spaces such as aircraft, ship hulls and especially car interiors. Due to the commercial importance of the automotive sector, standards for the assessment of emissions have been developed particularly for this industry, the reference standards being VDA 277:1995-01 (based on the measurement of the equilibrium composition of the atmosphere in an enclosed space above the sample after static heating to 120° C. for 5 hours) and VDA 278:2011 (based on the thermal desorption method); the method VDA 278:2011 also allows determining the release of condensable volatile compounds (referred to in the sector as FOG). For the automotive application, the tanned hide is typically subjected to further treatments such as retanning, after which it is pressed, split, shaved up to the thickness of 1.1-1.2 mm and finally subjected to analytical checks of the release of volatile compounds; tests of this type carried out on the hides tanned by the process of the invention have resulted in VOC values equal to or less than 0.01% by weight of the sulphonated oil used.

Finally, the process of the invention comprises the actual tanning step.

This step is carried out by adding the compounds listed below directly to the bath derived from the previous step, which is not unloaded from the drum.

Tanning generally lasts between 16 and 20 hours and requires the use of various compounds added to the bath at different times. The compounds used and the timings of their additions vary depending on whether the tanning is for wet blue productions or the tanning is for wet white productions.

In the case of wet blue tanning, a $Cr^{3+}$ salt, e.g. basic chromium (III) sulphate ($Cr(OH)SO_4$), possibly in a mixture with sodium sulphate, in an amount between 5 and 8%, between 0.5 and 0.8% of the above-described mixture of succinic, glutaric and adipic acids and about 0.2% of an anti-mould agent are added to the bath, leaving the system under rotation in the drum for 8 hours. Formic acid is then added in amounts between 0.3 and 0.5% allowing to react for 2 hours. An anti-mould agent (0.1%) and an alkaline compound (0.4%), which has the function of stabilising and fixing the chromium on the protein fibres of the hide, are then added, allowing to react for 4 hours; commonly the alkaline compound is calcium oxide or a mixture containing it. Finally, one or more washes are carried out with cold water (20° C.) in a total amount of about one and a half times the weight of the hide, with possible additions of small amounts (0.1% each) of formic acid and anti-mould agent, for a total time of about 2 hours and a half. Finally, the drum is unloaded and the hides are recovered and sent to the steps following the tanning.

In the case of wet white tanning (with tannins), a tanning agent, generally a phosphonium salt or a mixture of phosphonium salts (e.g. tetrakis(hydroxymethyl)phosphonium sulphate, $(P(CH_2OH)_4)_2SO_4$) in an amount between 2 and 4% and an anti-mould agent in an amount between 0.3 and 0.5% are initially added, and the drum is rotated for at least three hours; the tanning agent is generally used in the form of a 50% by weight aqueous solution. The hides are then allowed to rest in the bath without rotation for about 8 hours (conveniently, this step is carried out overnight). Next, sodium bicarbonate ($NaHCO_3$) is added in two successive aliquots of about 0.5% each; the second addition of bicarbonate is carried out about half an hour after the first one. Finally, after about an hour and a half, sodium percarbonate is added in an amount between 1.0 and 1.5% and the system is allowed to rest for about an hour and a half. Finally, the drum is unloaded and are added water at 40° C. in an amount by weight about the same as that of the hide, tannins (natural or synthetic) in an amount of about 4-5%, between 0.1 and 0.8% of an emulsion containing between 45 and 60% by weight of water and between 40 and 55% by weight of an oil consisting of one or more sulphonates of general formula R—$SO_3$H, wherein R is a C4-C20 alkyl radical (preferably C6-C14, more preferably C12-C14), and an amount between 0.1 and 0.2% of an anti-mould agent. The system is allowed to react in the drum under stirring for about three hours, after which the drum is unloaded and the hides are washed with an amount of cold water equal to about twice the weight of the hides for about 10 minutes, finally unloading the drum and recovering the hides which are sent to the steps following the tanning.

In its second aspect, the invention concerns a hide tanned by the process described above.

The tanned hide of the invention exhibits chemical stability (resistance to rot) and physical-mechanical characteristics comparable to, or even better than, the hides obtained by conventional tanning processes. Furthermore, the hides obtained by this process consistently showed a shrinkage temperature, Tg, above 75° C. in the case of tanning with tannins, and above 100° C. in the case of chromium tanning.

The invention will be further described by the following experimental part.

The samples of hide tanned by the process of the invention are tested in the examples by measuring the shrinkage temperature according to ISO 3380.

In short, the method consists of slowly heating a specimen in water and measuring the temperature at which a sudden shrinkage of the sample occurs. The instrument for carrying out the test is shown schematically in FIG. 1. The sample, 10, is completely immersed into water, initially at a temperature of 20±2° C., inside a container 11; the lower end of the sample is blocked with a fixed clamp 12, while the upper end is hooked to a mobile clamp 13 connected to a movement indicator 14 (an index pivoted at one end at the centre of a quadrant 15); a sample pretensioner 16, which exerts on the sample a force equivalent to a weight of 3 g, is also connected to the same axis on which the index is pivoted. Immersed in the water, near the centre of the sample, there is a thermometer 17 (in the set-up used in the tests, the thermometer was an IKA® ETS-D5 electronic digital thermometer, from the company IKA®-Werke GmbH & Co. KG, Staufen, Germany). To carry out the test, the temperature of the water is raised slowly (2° C./min) by means of an electric heater in a glass or quartz sheath, immersed in the water in the lower part of the container (not shown in the FIGURE). When the shrinkage temperature, indicated in the sector as Tg, is reached, the sample undergoes a sudden and irreversible shrinkage, which is visualised by the shift of the indicator 14. The measurement has an accuracy of ±0.5° C.

EXAMPLE 1

This example refers to the preparation of a wet blue tanning process (with chromium) according to the invention.

The amounts of added components are indicated as a percentage by weight with respect to the weight of the hide.

All process steps are carried out under continuous stirring, by rotation of the drum, except for the step of unloading of the different baths from the drum itself or some steps (identified in the description below) lasting overnight, during which the drum is rotated intermittently for a few minutes every hour or half an hour.

Two full-thickness fleshed-out calf hides, weighing 65 kg in total (for an average weight of more than 30 kg), which had already undergone the soaking and liming processes, were introduced into a drum.

The deliming step was carried out in three successive steps.

In the first step it was added to the drum:

100% water at 30° C.;

0.6% ammonium sulphate;

1.3% of a powdered mixture containing C4-C6 dicarboxylic acids, ammonium chloride, sulfamic acid and ammonium sulphate, in which the dicarboxylic acids are present at 30% by weight; and 0.2% non-ionic degreaser consisting of 2-propylethyl alcohol ethoxylate (content in the mixture 58%), 3% sodium salts of sulphates of C12-C14 alcohol ethoxylates and 0.04% 1,2-benzylisothiazol-3(2H)-one, the balance to 100% consisting of ammonium sulphate.

After an hour of treatment, this solution was unloaded from the drum.

The second phase of the deliming step was carried out under the same conditions and in the same way as the first step, the only difference being that the water temperature was 34° C.

In the third phase of the deliming step, the same components as in the first two steps were used, but in different amounts: 50% water at 36° C., 3% of the mixture containing the C4-C6 dicarboxylic acids, 0.5% ammonium sulphate and 0.25% of the above-mentioned degreasing mixture were used; treatment in this third step was continued for two hours, at the end of which the drum was not unloaded from the solution.

Maceration was then carried out. For this purpose, 0.2% of the mixture containing dicarboxylic acids described above and 0.2% of ammonium sulphate were added to the bath of the last deliming step (at 36° C.) and the hides were treated with this solution for 30 minutes; then 1% of a commercial pancreatic enzyme was added and the treatment was continued for 90 minutes; finally the bath was unloaded from the drum.

Before the step of the preparation for tanning, two washes were carried out, the first one lasting 20 minutes with 100% water at 20° C. and 0.3% of the above-mentioned degreasing mixture, followed by drum unloading; the second wash was carried out with sole water (100%) at 20° C. for 10 minutes followed by drum unloading.

The step of the preparation for tanning, characteristic of the invention, was then carried out. Water at 20° C. (amount 50%) and 1% of an emulsion containing 52% by weight of water and between 48% by weight of an oil consisting of a mixture of sulphonates of general formula R—$SO_3$H, wherein R is a C12-C14 alkyl radical, was added to the drum; the treatment continued for 20 minutes. 1% sodium acetate and 0.5% of a mixture of powdered C4-C6 dicarboxylic acids were then added and the treatment continued for two hours. The system was then allowed to rest overnight, with the drum rotating for only 5 minutes every hour.

In the morning, 0.65% of powdered C4-C6 dicarboxylic acids was added and the treatment was continued for 10 minutes. Then 0.2% of an anti-mould agent and 6.5% of a powder mixture containing 67% by weight of sodium sulphate and 33% by weight of basic chromium (III) sulphate ($CrOHSO_4$) were added, initially allowing the system to stir continuously for 8 hours, and then to rest (stirring for 3 minutes every 30 minutes) overnight.

The next morning, 0.4% formic acid was added and the treatment continued for 2 hours. 0.1% of anti-mould agent and 0.4% of calcium oxide were then added to raise the pH and fix the chromium, continuing the treatment for 4 hours.

Water was then added at 38° C. (50% amount) for two hours, the drum was unloaded, a 5-minute wash with 100% water at 20° C. was carried out and the drum was unloaded.

Finally, 100% water at 20° C., 0.1% of formic acid, 0.1% of anti-mould agent were introduced into the drum and the treatment was continued for 20 minutes. At the end of this treatment the drum was unloaded, the hides were extracted, pressed and stretched to dry on suitable pallets.

The dried hides had a clear blue tone, were well stretched without wrinkles or curves, and were very easy to machine mechanically; with regard to appearance and workability, the hides tanned by the process of the invention are at least comparable to, if not even better than, the wet blue hides obtained by the conventional process with pickling. A sample of hide produced in this example was also subjected to a shrinkage temperature measurement (Tg): no shrinkage occurred up to the maximum temperature allowed by the instrument; the shrinkage temperature of the sample is therefore above 100° C., confirming the excellent preservation properties over time of the tanned hide.

EXAMPLE 2

This example refers to the preparation of a wet white tanning process (with tannins) according to the invention.

As in Example 1, the amounts of added components are indicated as a percentage on the weight of the hide and all the steps of the process take place under stirring by continuous rotation of the drum except the unloading steps or the intermittent stirring steps.

Two full-thickness fleshed-out calf hides, weighing 62 kg in total (average weight of more than 30 kg) which had already undergone soaking and liming processes, were introduced into a drum.

The hides were subjected to an initial 20-minute washing treatment with 100% water at 30° C. which was then unloaded from the drum.

The deliming step was carried out in two successive steps.

In the first step it was added to the drum:

100% water at 34° C.;

0.4% ammonium sulphate;

1.0% of a powdered mixture containing C4-C6 dicarboxylic acids, ammonium chloride, sulfamic acid and ammonium sulphate, in which the dicarboxylic acids are present at 30% by weight; and 0.4% non-ionic degreaser consisting of 2-propylethyl alcohol ethoxylate (content in the mixture 58%), 3% sodium salts of sulphates of C12-C14 alcohol ethoxylates and 0.04% 1,2-benzylisothiazol-3(2H)-one, the balance to 100% consisting of ammonium sulphate.

After half an hour of treatment, this solution was unloaded from the drum.

The second step of the deliming step was carried out with 100% water at 36° C. by successive additions of components in the same solution.

Initially, 0.6% of the 30% dicarboxylic acid mixture, 0.1% of the non-ionic degreaser described above were added and the hides were treated under these conditions for 15 minutes. A second aliquot of 0.6% of the 30% dicarboxylic acid mixture was then added and allowed to react for 60 minutes. A third aliquot of 0.6% of mixture of 30% dicarboxylic acids was added and allowed to react for 30 minutes. Finally, a fourth aliquot of 0.3% of mixture of 30% dicarboxylic acids and 0.5% of ammonium sulphate were added and allowed to react for 90 minutes.

Maceration was then carried out by adding 0.2% of a mixture of 30% dicarboxylic acids and 1% of a commercial pancreatic enzyme to the same solution deriving from deliming and the treatment was continued for 90 minutes, finally unloading the solution from the drum.

Prior to the step of the preparation for tanning, two washes were performed, the first one lasting 20 minutes with 200% water at 20° C. followed by drum unloading; the second wash was performed with 200° C. water at 20° C. and 0.2% hydrogen peroxide for 20 minutes followed by drum unloading.

The step of the preparation for tanning, characteristic of the invention, was then carried out. Water at 20° C. (amount 50%), 0.15% of anti-mould agent and 1.5% of an emulsion containing 52% by weight of water and between 48% by weight of an oil consisting of a mixture of sulphonates of general formula R—$SO_3H$, wherein R is a C12-C14 alkyl radical, were added to the drum; the treatment continued for 20 minutes. Then 0.5% of a mixture of powdered C4-C6 dicarboxylic acids was added, continuing the treatment for 20 minutes, followed by 2% of sodium formate, continuing the treatment for a further 20 minutes.

The tanning treatment was then carried out.

To this end, 3% of phosphonium salts and 0.35% of anti-mould agent were added to the bath described above and the system was allowed to react initially for three hours and then throughout the night.

The next morning, a first aliquot of 0.5% of sodium bicarbonate was added to the bath, allowing it to react for 30 minutes, followed by a second aliquot of 0.5% of sodium bicarbonate, allowing it to react for two hours.

1.2% of sodium percarbonate (tanning stabiliser) was then added and the system was allowed to react for 90 minutes, with the bath then unloaded from the drum.

Finally, 200% water at 40° C., 4% of commercial tannins, 0.15% of an anti-mould agent and 0.5% of an emulsion containing 52% by weight of water and between 48% by weight of an oil consisting of a mixture of sulphonates of general formula R—$SO_3H$, wherein R is a C12-C14 alkyl radical, were added and the system was allowed to react for three hours.

Finally, the drum was unloaded from the bath, a washing with 200% of water at 20° C. for 10 minutes was carried out, and the hides were extracted and dried.

The dried hides were cream to white in colour, were well stretched without wrinkles or creases, and were easy to machine mechanically; in these respects the hides tanned by the process of the invention are at least comparable to, if not even better than, the wet white hides obtained by the processes of the prior art.

The shrinkage temperature of a sample of hide thus obtained was measured and found to be equal to 78° C., confirming the excellent preservation properties over time.

Some samples obtained from the thus tanned hides were also subjected to volatile organic compound (VOC) emission measurements. A hide from this example was pressed, split and shaved up to a thickness of 1.1-1.2 mm, and a sample was taken from it and subjected to measurement using the method VDA 278:2011, and emissions of organic compounds equal to VOC 249 mg/Kg (expressed as toluene) and FOG 1373 mg/Kg (expressed as C16 hydrocarbons)

were found. The second hide of the example was treated in the same way as the first hide, and three samples were taken from it and measured using the method VDA 277:1995-01, finding in the three measurements release values of volatile organic compounds equal to 22.8 μgC/g, 21.8 μgC/g and 20.9 μgC/g, respectively (the measurement unit μgC/g indicates the μg of carbon in the VOCs emitted per g of sample).

Commentaries on the Results

As shown in the examples, with the process of the invention it is possible to obtain tanned hides having chemical stability (resistance to rot) and physical-mechanical characteristics comparable to, or even better than, hides obtained by conventional tanning processes.

The process of the invention makes it possible, in an unexpected way, to achieve this result without the need for a pickling step, with the consequent elimination from the process wastewater of acids such as sulphuric, formic and in some cases also hydrochloric acid, and the reduction in this water of 6-8% (by weight of the hides) of sodium chloride.

This allows to obtain the same results obtained with traditional tanning, but with a notable reduction of chlorides, sulphates, and COD ("Chemical oxygen demand"); this last parameter is the overall measure of oxidizable organic and inorganic substances present in a water sample, and therefore gives an indication of the total amount of potential pollutants contained in the water itself.

In addition, the use of the special sulphonated oils in the characteristic process step, alternative to pickling, also enables a significant reduction in VOC and FOG (volatile organic compound emissions) values to be obtained in the final product.

The invention claimed is:

1. A process for the tanning of hides which includes the steps of soaking, liming, deliming, maceration, preparation for tanning, and tanning, characterized in that in the step of preparation for the tanning the hides are treated with a liquid mixture consisting of

- water in an amount between 40 and 60% by weight with respect to the weight of the hide;
- between 0.5 and 2.5% by weight with respect to the weight of the hide of an emulsion containing between 45 and 60% by weight of water and between 40 and 55% by weight of an oil consisting of sulphonates of general formula $R—SO_3H$, wherein R is a C4-C20 alkyl radical;
- between 0.2 and 1.5% by weight with respect to the weight of the hide of a mixture of C4-C6 dicarboxylic acids containing between 10 and 30% by weight of succinic acid, between 40 and 60% by weight of glutaric acid and between 15 and 35% by weight of adipic acid;
- a salt selected from sodium acetate and sodium formate in an amount between 1 and 2% by weight with respect to the weight of the hide: and optionally an antibacterial component.

2. The process according to claim 1 wherein R is a C12-C14 alkyl radical.

3. The process according to claim 1 wherein the antibacterial component is added to the liquid mixture of the step of preparation for tanning, in an amount between 0.1 and 0.2% by weight with respect to the weight of the hide.

4. The process according to claim 3 wherein said antibacterial component comprises 25-35% by weight of sodium salt of 4-chloro-3-methylphenol, 8-12% of 2-phenylphenol, 11-15% of diethylene glycol and 12-14% of sodium hydroxide, with water as a 100% complement.

5. The process according to claim 1, wherein the soaking step is carried out with a first step of continuous washing with running water for one hour or of discontinuous washing with the addition of two successive aliquots of water each in an amount of about twice the hide weight; and a second step of treatment in a drum with an amount of water of about twice the weight of the hide, at a temperature between 20 and 45° C., for 16-24 hours, optionally with the addition of surfactant detergents and/or salts which give the solution a basic pH.

6. The process according to claim 5 wherein when the treatment in the drum is carried out at a temperature between 25° C. and 45° C., an antibacterial component is added to the water, and in which the salt which gives basic pH to the water is sodium bicarbonate.

7. The process according to claim 1, wherein the liming step is carried out at room temperature, for a time between 18 and 36 hours, with a composition containing a weight of water about double that of the hide to be treated, $Ca(OH)_2$ in an amount between 3 and 5% with respect to the weight of the hide to be treated, and a compound selected from sodium sulphide ($Na_2S$) used in an amount between 2 and 3% with respect to the weight of the hide to be treated and sodium hydrosulphide (NaHS) in an amount between 0.5 and 1% by weight with respect to the hide to be treated.

8. The process according to claim 1, wherein the deliming step is carried out at a temperature between 30 and 38° C. in two successive phases, each carried out with an amount of water equal to the weight of hide to be treated, by draining the water between one phase and the next, and in which the second phase is carried out at a higher temperature than the first one, in an overall time between 3 and 4 hours, further comprising in at least one of the two phases:

- between 0.8 and 1.5% with respect to the weight of the hide in the case of split hides, and between 1.5 and 3% with respect to the weight of the hide in the case of non-split hides, of a mixture containing between 40 and 45% of ammonium chloride ($NH_4Cl$), between 20 and 30% of one or more C4-C6 dicarboxylic acids, and between 0.5 and 1.5% of sulfamic acid ($H_2NSO_3H$), with the balance to 100% consisting of ammonium sulphate ($NH_4SO_4H$);
- between 0.4 and 1.0% with respect to the weight of the hide of ammonium sulphate; and
- between 0.3 and 1.5% with respect to the weight of the hide of a degreaser.

9. The process according to claim 8, wherein said degreaser is a liquid mixture consisting of 54-58% by weight of 2-propylethyl alcohol ethoxylate (CAS 160875-66-1), between 2 and 3% of sodium salts of sulphates of C12-C14 alcohol ethoxylates (CAS 68891-38-3), between 0.01 and 0.04% of 1,2-benzylisothiazol-3(2H)-one (CAS 2634-33-5), the balance to 100% consisting of ammonium sulphate.

10. The process according to claim 1, wherein the maceration step is carried out at a temperature between 30 and 37° C., for a total time between 3 and 5 hours, with an amount of water between 0.5 and 1 times the weight of the hide to be treated, to which an amount between 0.5 and 1.5% by weight with respect to the weight of the hide of pancreatic enzymes is added, and in which said maceration step is followed by two or three washes, each lasting between 10 and 20 minutes, with a total amount of water between 2 and 4 times the weight of the hide.

11. The process according to claim 10, wherein in the maceration step or in the subsequent two or three washes one or more components are added selected from:

- up to 0.5% by weight of a degreaser;

up to 1.2% of a mixture containing between 40 and 45% of ammonium chloride ($NH_4Cl$), between 20 and 30% of one or more C4-C6 dicarboxylic acids, and between 0.5 and 1.5% of sulfamic acid ($H_2NSO_3H$), with the balance to 100% consisting of ammonium sulphate ($NH_4SO_4H$);

up to 0.2% by weight of ammonium sulphate; and up to 0.4% by weight of hydrogen peroxide.

12. The process according to claim 1, wherein the tanning step is carried out in a drum as chrome tanning according to the following steps:

addition in the bath derived from the step of preparation for tanning of a $Cr^{3+}$ salt in an amount between 5 and 8% with respect to the weight of the hide, optionally mixed with sodium sulphate, between 0.5 and 0.8% with respect to the weight of the hide of a mixture of C4-C6 dicarboxylic acids containing between 10 and 30% by weight of succinic acid, between 40 and 60% by weight of glutaric acid and between 15 and 35% by weight of adipic acid, and between 0.1 and 0.3% with respect to the weight of the hide of an antibacterial component, allowing the system to react under stirring for at least 8 hours;

addition of formic acid in an amount between 0.3 and 0.5% with respect to the weight of the hide, allowing the system to react under stirring for at least 2 hours;

addition of an antibacterial agent in an amount between 0.1 and 0.2% with respect to the weight of the hide and of a basic chromium-stabilizing compound in an amount between 0.2 and 0.5% with respect to the weight of the hide, allowing the system to react under stirring for at least 4 hours and then unloading the drum from the solution contained therein;

one or more washes with cold water in a total amount of about one and a half times the weight of the hide, with possible additions of formic acid and antibacterial agent in amounts of up to 0.1% each with respect to the weight of the hide, for a total time of about 2 hours and a half, and finally unloading the drum and recovering the hides that are sent to the steps following the tanning.

13. The process according to claim 1, wherein the tanning step is carried out in a drum as tanning with tannins, according to the following steps:

addition in the bath derived from the step of preparation for tanning of a phosphonium salt or a mixture of phosphonium salts in an amount between 2 and 4% with respect to the weight of the hide and an antibacterial component in an amount between 0.3 and 0.5% with respect to the weight of the hide, allowing the system to react under stirring for at least 3 hours and then allowing the system to rest for at least 8 hours;

addition of sodium bicarbonate ($NaHCO_3$) in two successive aliquots each for an amount between 0.25 and 1% with respect to the weight of the hide, allowing the system to react under stirring for at least half an hour;

addition of sodium percarbonate in an amount between 1.0 and 1.5% with respect to the weight of the hide, allowing the system to react under stirring for an hour and a half and then unloading the drum from the contained solution;

addition of water at 40° C. in an amount by weight between 0.8 and 1.2 times that of the hide, natural or synthetic tannins in an amount by weight between 3 and 6% with respect to the weight of the hide, between 0.1 and 0.8% with respect to the weight of the hide of an emulsion containing between 45 and 60% by weight of water and between 40 and 55% by weight of an oil consisting of sulphonates of general formula R—$SO_3H$ wherein R is a C4-C20 alkyl radical, and an antibacterial component in an amount ranging from 0.1 to 0.2% with respect to the weight of the hide, allowing the system to react under stirring for at least three hours and then unloading the drum from the solution contained therein;

washing the hides for a time between 5 and 20 minutes with cold water in an amount between 1.5 and 2.5 times the weight of the hides, finally unloading the drum and recovering the hides that are sent to the steps following the tanning.

14. A hide tanned according to the process of claim 1, having shrinkage temperature higher than 100° C. in the case of wet blue hide and higher than 75° C. in the case of wet white hide.

* * * * *